United States Patent [19]

Preux

[11] 4,198,857
[45] Apr. 22, 1980

[54] MEASURING SYSTEM

[76] Inventor: Roger Preux, 70, rue Philippe Dartis, 93031 Epinay S/Seine, France

[21] Appl. No.: 903,751

[22] Filed: May 8, 1978

[30] Foreign Application Priority Data

May 13, 1977 [FR] France ................................ 77 14778

[51] Int. Cl.² .............................................. G01L 1/02
[52] U.S. Cl. ..................................... 73/141 R; 212/2
[58] Field of Search ............. 73/141 R; 177/146, 147, 177/141; 212/2, 39 R; 214/2

[56] References Cited

U.S. PATENT DOCUMENTS

| | | | |
|---|---|---|---|
| 2,477,854 | 8/1949 | Baker | 177/146 |
| 2,877,906 | 3/1959 | Coash et al. | 214/2 |
| 2,932,501 | 4/1960 | Hicks | 177/209 |
| 3,291,234 | 12/1966 | Woodburn | 177/146 X |
| 3,371,800 | 3/1968 | Grove | 212/39 R |
| 3,854,593 | 12/1974 | Gross | 212/39 R |

*Primary Examiner*—Charles A. Ruehl
*Attorney, Agent, or Firm*—J. Harold Nissen

[57] ABSTRACT

A system for measuring the force exerted on two or more hydraulic jacks, each carrying the same load. The system comprises for at least each of the main chambers of the jacks, a sensor to measure the pressure of the hydraulic fluid and a calculation member making it possible to calculate, from the electrical signals provided by the sensors, the total force exerted on the set of jacks. The system is particularly applicable for detecting the force exerted on the jacks for actuating the jib of a crane.

8 Claims, 3 Drawing Figures

MEASURING SYSTEM

The invention relates to a system for measuring the force exerted on two or more hydraulic jacks, each carrying the same load.

It relates more particularly, but not exclusively, to a system for measuring the force exerted on the jacks for actuating (as regards inclination) the jib of a crane, in particular a telescopic crane, for the purpose of determining the load applied to the hook of the crane.

Generally, it is known that the pressure exerted on the jacks for actuating the jib of a crane, or of a similar mechanical system, is not the same on each of the jacks and depends essentially on the geometry or deformations of the jib or of the system.

Consequently, in order to measure the force exerted on all the jacks, the conventional solution consists of connecting, by means of one or more conduits, all the chambers of the jacks such that a pressure equilibrium is established between the various jacks and this pressure is measured. Thus, in the case of single-acting jacks, the force exerted on all the jacks is equal to the product of the pressure and the sum of the surfaces of the pistons of each of the jacks.

However, this method of determination which makes it possible to provide suitable results, suffers from a major drawback which resides in the fact that it considerably decreases the safety of the crane or of the mechanical system due to the risk of rupture of the conduit connecting the chambers of the jacks.

This risk of rupture is all the more considerable since these conduits may frequently follow circuitous routes and pass through points which are exposed to impacts. Furthermore, it is not possible to provide safety valves in the connecting circuit, which would prevent a pressure equilibrium from being established between the various jacks. Consequently, in the case of a crane, rupture of the pipe connecting the various jacks frequently causes the jib to fall.

The invention therefore intends to eliminate this drawback. To this end, it proposes to abolish the pipe connecting the various jacks and to provide in its place on the one hand, a pressure sensor in at least each of the main chambers of the jacks and on the other hand, a calculation member making it possible to calculate from the electrical signals provided by the sensors, the total force exerted on all the jacks and this is by adding the forces or pressures exerted on each of the jacks.

For a better understanding, one method and system for carrying out the method of applying the invention to determine the force exerted on a pair of jacks by a telescopic jib of a crane will be described hereinafter as a non-limiting example with reference to the accompanying drawing, in which.

Figure 1:
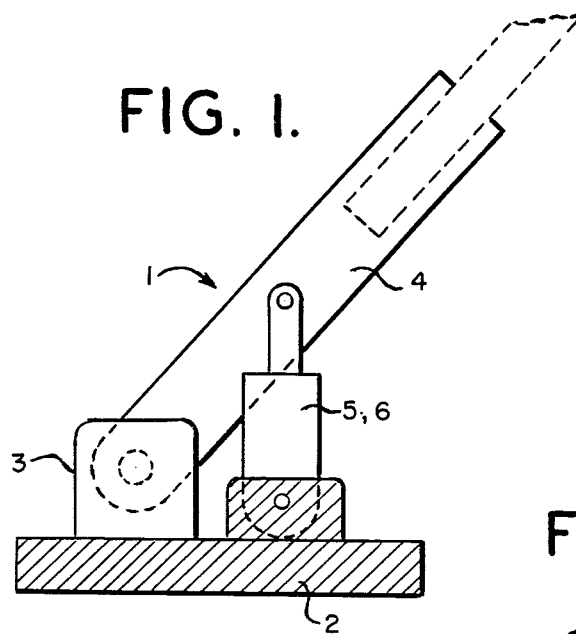
FIGS. 1 and 2 show diagrammatically, in longitudinal section in FIG. 1 and in cross section in FIG. 2, a telescopic crane provided with two double-acting jacks.
Figure 2:
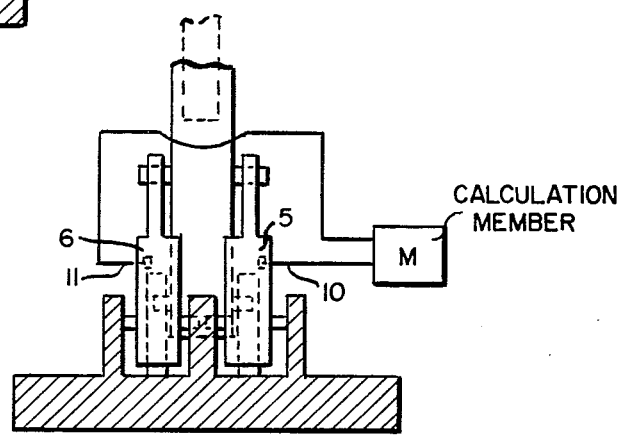

With reference to FIGS. 1 and 2, the crane 1 is composed, very diagrammatically, of a base 2 which may be rotary, movable, self-propelled etc. and which comprises a fork-joint 3 by means of which the telescopic jib 4 of the crane 1 is pivoted.

The inclination of the jib 4 is controlled by a pair of identical jacks 5, 6, located on either side of the jib 4 and pivoted at one end on the jib 4 and at the other end on the base 2.

It is obvious that the forces exerted by the jib 4 on each of the jacks 5, 6 are rarely equal. Consequently, in order to measure the total force exerted on the two jacks, it is not possible to measure the force exerted on one of the jacks, then to multiply the latter by two.

This is why, at the present time, the main chambers of the jacks are connected by means of a conduit providing communication between the main chambers of the jacks (or the single chamber in the case of single-acting jacks). Consequently, each of the pressures in the individual chambers of the jacks is constantly equal and may be measured as a unit by providing a sensor in the region of the conduit.

For the afore-mentioned reasons of safety, the invention eliminates the use of conduits connecting the respective chambers of the two jacks and provides in place of the latter a separate pressure sensor 10 and 11 in the main chambers 12 and 13 of each of the two jacks 5 and 6. Naturally, in the case of single-acting jacks, these pressure sensors are arranged in the single chamber of the jack. And, on the other hand, in the case of a double-acting jack, the sensors 10 and 11 are installed in the large chamber of each of the jacks and because the on the surface area pressures in the small chambers behind the main surface area of the piston are generally identical (returned to the reservoir R without a valve), only one sensor 14 or 15 is provided in the small chamber of one of the jacks 5 or 6.

In all cases, it should be noted in this respect that a valve is provided on the fluid inlet to the large chamber of the jack, in order to prevent any rupture of the pipe from having dangerous consequences.

From the information relating to pressure provided by the sensors, calculation of the force exerted on all the jacks is obtained by means of the following relationships:

(a) In the case where single-acting jacks are used, the force F exerted on the jacks may be written as:

$$F = \sum_{o}^{i} P_i S_i \qquad (1)$$

in which $P_i$ is the pressure measured by each of the pressure sensors 10 and 11 and $S_i$ is the main surface area of the piston of each of the jacks.

In the situation when both of the jacks 5 and 6 are identical, the expression (1) becomes:

$$F = S(P_1 + P_2 + \ldots P_i) \qquad (2)$$

Thus, in this case, the calculation member is composed of a simple adder which adds the pressures measured and of an amplifier having a gain corresponding to S.

Figure 3:
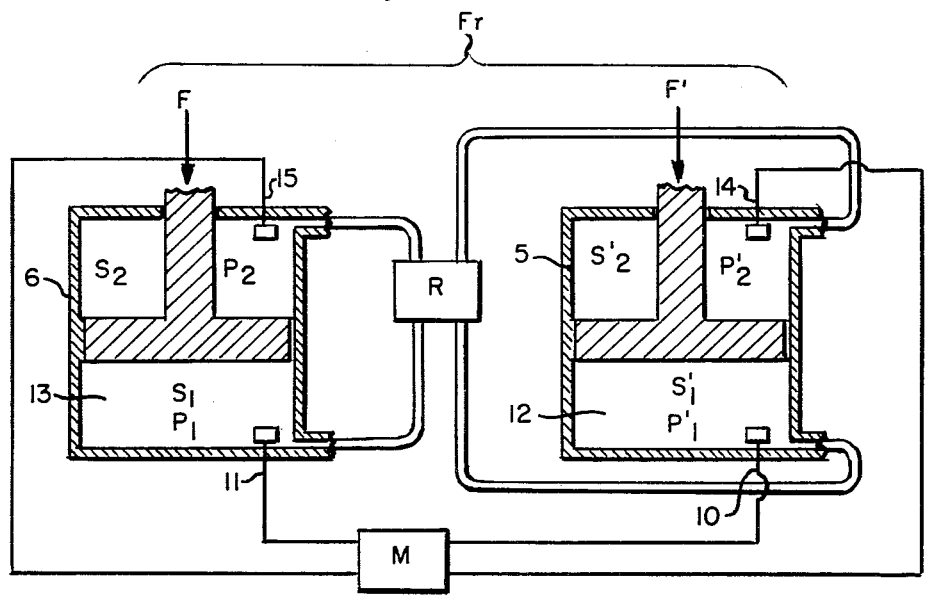
FIG. 3 is a diagrammatic view making it possible to show the various forces and pressures exerted in the two jacks.

(b) When a double-acting jack is used, for example one of those shown diagrammatically in FIG. 3, a sensor is provided in each chamber on the small surface area $S_2$ behind the main surface area $S_1$ and one subtracts from the pressure $P_1$ of the large chamber, the pressure $P_2$ of the small chamber corrected according to the ratio $$\frac{S_2}{S_1}$$

of the sections, according to the formula:

$$\frac{F}{S_1} = P_1 - \frac{S_2}{S_1} P_2 \qquad (3)$$

A pressure $$\frac{F}{S_1}$$

is obtained, from which it is easy to obtain the force F, since $S_1$ is known.

(c) When two double-acting jacks are used, as shown in FIG. 3, the formula (3) thus becomes:

$$\frac{F}{S_1} = P_1 + P_1' - \frac{S_2}{S_1}(P_2 + P_2') \qquad (4)$$

Thus, in order to calculate the force F, it is necessary to use a calculation member M which is connected with the pressure sensors and which is able to add the pressures measured in the large chambers of the jacks and to subtract from this sum, the sum of the pressures measured in the small chambers, modified by the ratio of the surfaces of the piston, the overall result being amplified by a gain k, corresponding to the value of $S_1$.

As afore-mentioned, owing to the fact that the pressure in the small chambers of the jacks is equal, the relationship (4) becomes:

$$\frac{F}{S_1} = P_1 + P_1' - 2\frac{S_2}{S_1} P_2 \qquad (5)$$

(d) When n double-acting jacks are used, the relationship (4) becomes:

$$\frac{F}{S_1} = \overset{n}{\Sigma} P_1^n - \frac{S_2}{S_1}(\Sigma P_2^n)$$

and the relationship (5) becomes:

$$\frac{F}{S_1} = \overset{n}{\Sigma} P_1^n - n\frac{S_2}{S_1} P_2$$

It is obvious that in each of the cases it is possible to use independent jacks and to effect calculation of the force F, one uses the signals directly representative of the pressure exerted in each of the jacks.

I claim:

1. A system for measuring the force exerted on a set of separately operable hydraulic jacks each carrying the same load for actuating the jib of a crane, wherein each said hydraulic jack has a main chamber fluidly isolated from the main chamber of the other said hydraulic jacks and being free of fluid connecting circuits therebetween comprising:

pressure sensors, one associated with each of said main chambers for sensing the pressure of the fluid therein, and each said pressure sensor producing a signal output characteristic of the pressure of the fluid in its said associated main chamber; and, a calculation member coupled to each of said pressure sensors responsive to the signal output thereof to summate the forces derived from the pressure applied to each of the main piston areas in each of said main chambers and to calculate the total force from the individual forces exerted on each jack individually of said set of jacks.

2. A system for measuring the force exerted on a set of hydraulic jacks each carrying the same load for actuating the jib of a crane, said hydraulic jacks each having a main chamber, comprising:

pressure sensors, one associated with each of said main chambers for sensing the pressure of the fluid therein, and each said pressure sensor producing a signal output characteristic of the pressure of the fluid in its said associated main chamber;

a calculation member coupled to each of said pressure sensors responsive to the signal output thereof to summate the pressure in each of said main chambers and calculate the total force exerted on said set of jacks; and, said set of jacks comprises two double-acting jacks each having said main chamber and a small chamber, said main chamber being a large chamber, in which:

said pressure sensors include a large chamber pressure sensor for each said large chambers and a small chamber pressure sensor for said small chambers, and said calculation member is coupled to all of said pressure sensors to calculate said total force F exerted on said two jacks according to the following relationship:

$$\frac{F}{S_1} = P_1 + P_1' - \frac{S_2}{S_1}(P_2 + P_2')$$

in which:

$P_1$ and $P_1'$ are the pressures measured in said large chambers of said jacks by said large chamber pressure sensors, $S_1$ and $S_2$ are the surface areas of sections of the piston of said jacks, adjacent to said large chamber and adjacent to said small chamber, respectively, and $P_2$ and $P_2'$ are the pressures measured in said small chambers of the jacks by said small chamber pressure sensors.

3. System according to claim 2, wherein in order to measure the pressure in the small chambers of the jacks, a single sensor is used, which is associated with the small chamber of one of the jacks, the calculation of the force F being effected according to the relationship:

$$\frac{F}{S_1} = P_1 + P_1' - 2\frac{S_2}{S_1} P_2$$

4. System according to claim 2, wherein when n identical double-acting jacks are used, the calculation member effects the calculation of the force F according to the formula:

$$\frac{F}{S_1} = \overset{n}{\Sigma} P_1^n - \frac{S_2}{S_1}(\Sigma P_2^n)$$

in which $P_1^n$ and $P_2^n$ are respectively the pressures measured in each of the large chambers and small chambers.

5. System according to claim 3 or 4, wherein in the case where the pressure in the small chambers of the jacks is equal to said pressure $P_2$, the calculation of the force F takes place according to the relationship $$\frac{F}{S_1} = \overset{n}{\Sigma} P_1{}^n - n \frac{S_2}{S_1} P_2.$$

6. A system for measuring the force exerted on a set of hydraulic jacks each carrying the same load for actuating the jib of a crane, said hydraulic jacks each having a main chamber, comprising:
    pressure sensors, one associated with each of said main chambers for sensing the pressure of the fluid therein, and each said pressure sensor producing a signal output characteristic of the pressure of the fluid in its said associated main chamber;
    a calculation member coupled to each of said pressure sensors responsive to the signal output thereof to summate the pressure in each of said main chambers and calculate the total force exerted on said set of jacks; and,
    said set of jacks comprises at least two identical double-acting jacks each having said main chamber and a small chamber, said main chambers being free of hydraulic fluid connecting circuits therebetween to prevent falling of said jib due to rupture of said connecting circuits, and including:
    a single pressure sensing device coupling to one of said small chambers for producing an output signal characteristic of the pressure in all of said small chambers,
    said single pressure sensing device having its output signal coupled to said calculation member for calculation of said total force F exerted on said two jacks according to the following relationship:

$$\frac{F}{S_1} = P_1 + P_1' - 2 \frac{S_2}{S_1} P_2$$

wherein:
    $P_1$ is the pressure measured by the pressure sensor associated with one of said main chambers,
    $P_1'$ is the pressure measured by the pressure sensor associated with the other of said main chambers,
    $P_2$ is the pressure measured by said single pressure sensing device,
    $S_1$ is the surface area of the piston face forming a wall of said main chamber,
    $S_2$ is the surface area of the piston face forming a wall of said small chamber.

7. The system as claimed in claim 6, including n double-acting jacks, wherein:
    said calculation member calculates the total force F according to the following relationship:

$$\frac{F}{S_1} = \overset{n}{\Sigma} P_1{}^n - n \frac{S_2}{S_1} P_2.$$

8. The system as claimed in claim 2 or 6, wherein:
    said chambers are free of hydraulic fluid connecting circuits therebetween to prevent falling of said jib due to rupture of said connecting circuits.

* * * * *